April 8, 1952 D. R. HOLDREN 2,592,141
ARTICLE ARRANGING APPARATUS
Filed April 9, 1949 2 SHEETS—SHEET 2
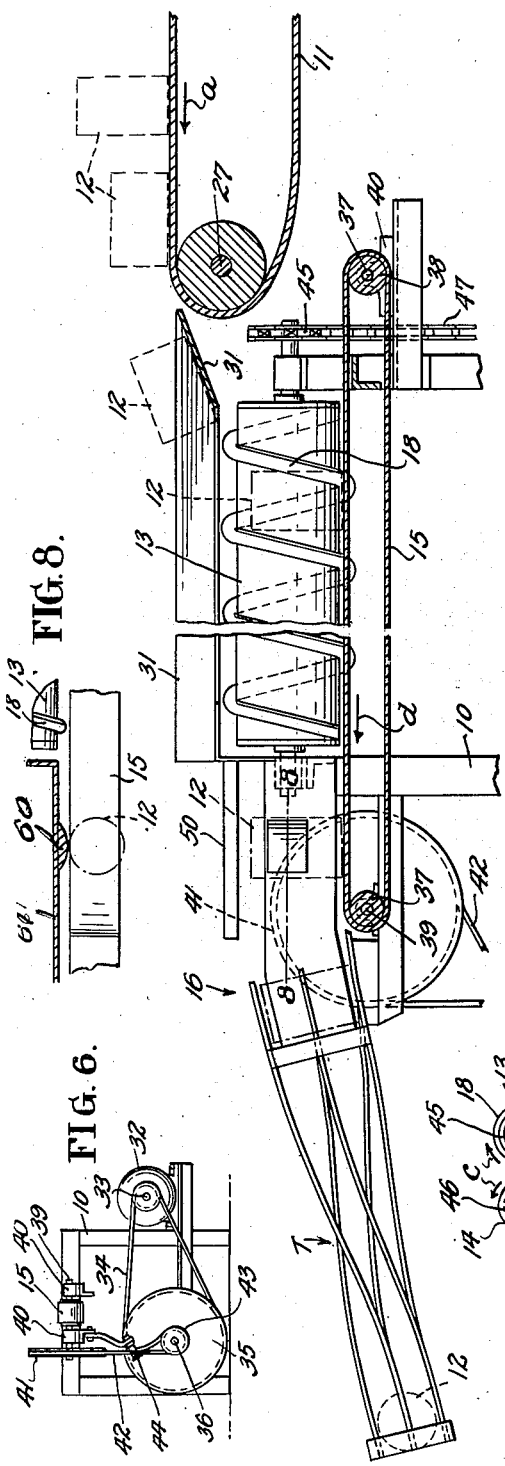
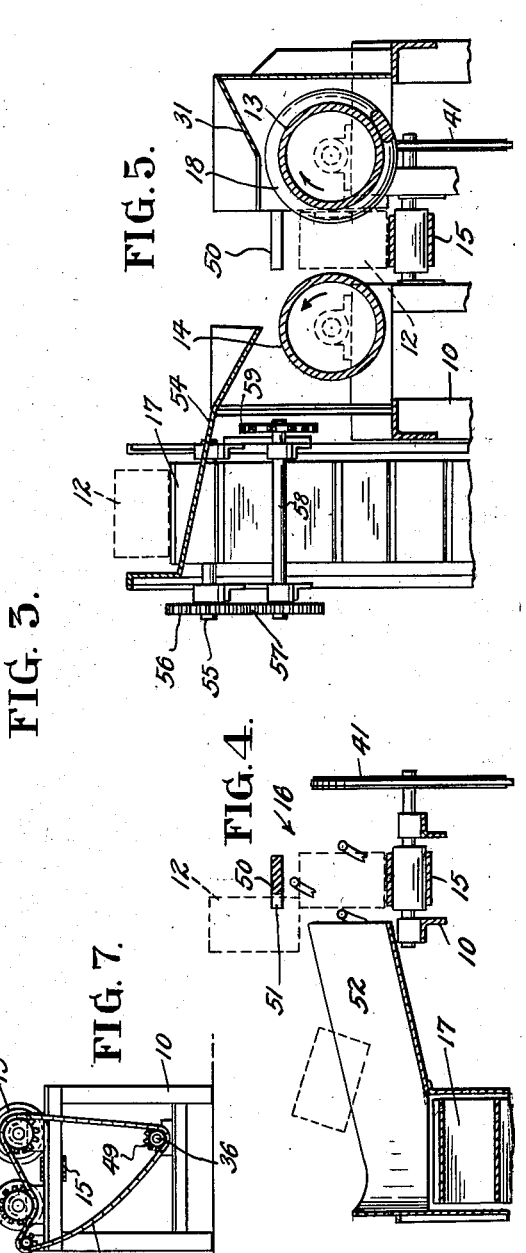
Inventor
Donald R. Holdren
By
Attorney Patented Apr. 8, 1952

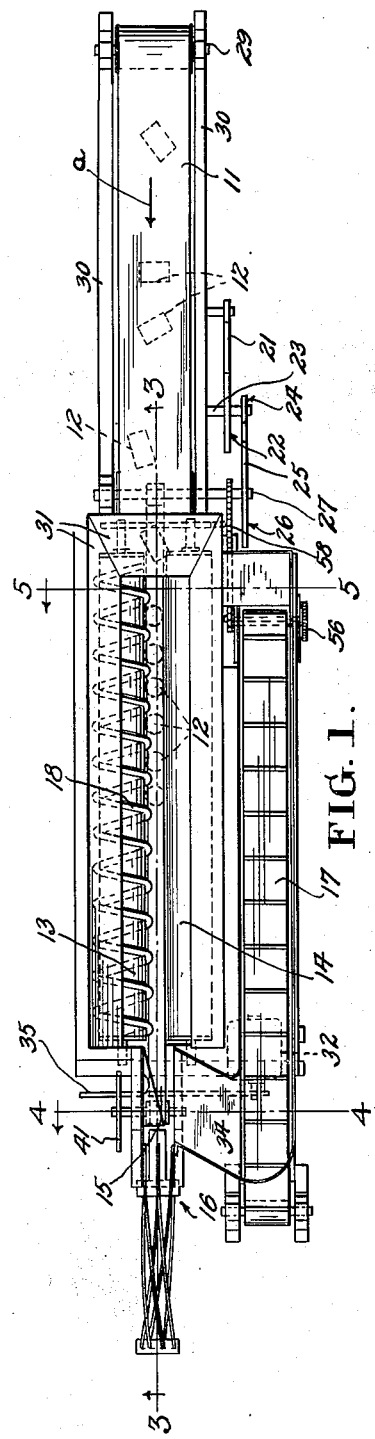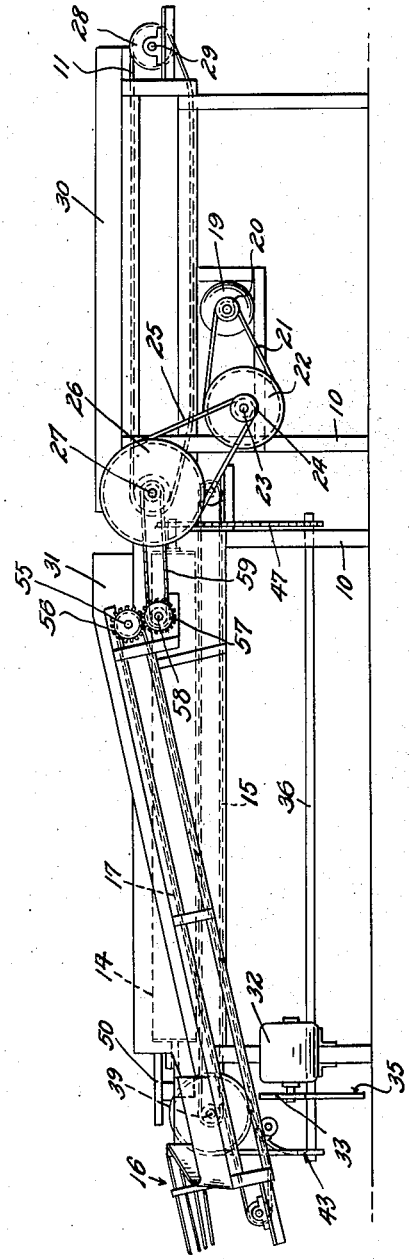
Inventor
Donald R. Holdren

2,592,141

UNITED STATES PATENT OFFICE 2,592,141

ARTICLE ARRANGING APPARATUS

Donald R. Holdren, West Liberty, Ohio

Application April 9, 1949, Serial No. 86,431

9 Claims. (Cl. 198—33)

This invention relates to article-arranging apparatus. More particularly, the invention is directed to apparatus capable of automatically assembling and disposing in an established definite order, a number of objects or articles originally presented to the apparatus in a state of relative disorder or misalignment. In its more specific aspects, the present invention is concerned with a machine for effecting a desired alignment of cylindrical cans of the kinds used in the packing of foods and other products.

After food stuffs, for example, have been placed in cans, heat treated, sealed therein and passed through a liquid cooling bath, the cans are disposed in a disorderly manner with respect to the matter of an alignment thereof in rows permitting of rapidly executed labeling and/or boxing operations being performed thereon. At present, it is customary to effect an orderly arrangement of the cans by manually executed operations, which are both slow and costly.

Accordingly, among the primary objects of this invention are: first, to provide an improved automatically operating means whereby cylindrical cans disposed in various positions of order or disarray on a conveyor belt are delivered to apparatus which, through engagement with the cans, automatically positions the same in a definite regular row-forming order, whereby the same may be fed automatically to labeling or packaging machines in a manner admitting of their rapid and proper handling; second, to provide arranging apparatus involving a pair of spaced parallel revoluble rolls, one of the rolls being provided with a smooth cylindrical surface and the other with a helical rib, the rolls being operative to dispose cans engaged therewith in definite row-forming order, as the cans advance between said rolls on a longitudinally movable conveyor; and, third, to provide apparatus of this nature which is simple in construction, easy to maintain in operation and proper working adjustment and one of low primary and operational costs.

For a further understanding of the invention, reference is to be had to the following description and the accompanying drawings, wherein:

Fig. 1 is a top plan view of can-positioning apparatus formed in accordance with the present invention;

Fig. 2 is a side elevational view of said apparatus;

Fig. 3 is a detail vertical longitudinal sectional view taken through the apparatus on the plane indicated by the line 3—3 of Fig. 1;

Fig. 4 is a vertical transverse sectional view taken through the apparatus on the plane disclosed by the line 4—4 of Fig. 1;

Fig. 5 is a similar view on the line 5—5 of Fig. 1;

Fig. 6 is a detail view of the motor drive;

Fig. 7 is a similar view of the drive belt mechanism for operating the revoluble rolls of the apparatus;

Fig. 8 is a detail horizontal sectional view taken on the plane indicated by the line 8—8 of Fig. 3.

Referring more particularly to the drawings, my improved apparatus comprises a frame structure 10 on which is supported, for movement in the direction indicated by the arrow $a$ of Fig. 1, an endless conveyor belt 11 by means of which cylindrical cans, indicated at 12, are positioned in various order thereon for longitudinal travel. While the apparatus may be employed in different locations in a canning factory, I have found that it may be installed advantageously for the purpose of taking "scrambled" cans of food stuffs from a cooling pit or tank conveyor, and straightening or "unscrambling" the cans, and directing same into a track which carries the cans to labeling and/or boxing machines.

Primarily, the machine consists of two rolls, indicated at 13 and 14 in the drawings, a belt conveyor 15 disposed between and below the longitudinal axes of the rolls, a sorting mechanism, indicated at 16 in the drawings, and disposed at the can-discharging end of the conveyor 15, and a return conveyor 17, all these parts being suitably carried by the frame structure 10 and forming constituent parts of the complete machine.

The roll 13 may be formed from a desired length of standard metal pipe, having a smooth cylindrical outer surface on which is mounted by welding a helical rib or flight 18. This rib or flight has a lead such that the resulting space between each flight, when the same is viewed in a longitudinal plane, is slightly less than the length or height of the can. The complemental roll 14 is formed from a length of standard pipe of about the same diameter as the roll 13, but has its smooth outer peripheral surface formed without including the helical rib or flight.

The feeding conveyor shown at 11 is designed to carry cans from a slowly moving cooling pit conveyor, not shown, to the can-arranging rolls 13 and 14. The feeding conveyor belt may be driven by an electric motor 19, the armature shaft of which is provided with a sheave 20 around which passes an endless belt 21 which leads to a belt wheel 22 arranged on a countershaft 23 journaled in the frame structure 10. The countershaft 23, in this instance, is provided with a sheave 24, rotatable with the belt wheel 22, and around which passes an endless drive belt 25, which leads to an enlarged belt wheel 26 fixed upon a transversely journaled drive shaft 27 for the conveyor belt 11. The drive shaft may be equipped with a belt roll at the discharge end of the conveyor around which the conveyor belt 11 passes for guidance and driving purposes. Also, the belt 11 is trained around a second roll 28 mounted on a freely turnable shaft 29 which is supported for rotation in bearings carried by the forward or can-receiving end of the frame structure 10, as shown more particularly in Fig. 2. The frame structure may be provided with upstanding side boards 30 to retain the cans 12 against lateral displacement while the same are being moved longitudinally in the direction of the arrow $a$ on the conveyor 11.

As shown especially in Figs. 1 and 3, the cans 12 positioned and traveling on the upper run of the conveyor belt 11 are in various positions: that is, erect or lying on their sides, with their longitudinal axes arranged in parallel order or in relatively angular order, the cans occupying positions on the belt 11 produced through the operation of the associated cooling pit conveyor. The purpose of the present invention, as previously stated, is to rearrange the cans automatically in orderly rows suitable for high speed operations on the part of associated labeling or boxing machines. To accomplish this, the frame structure 10 is provided at the discharge end of the belt 11 and above the rolls 13 and 14 with a generally rectangular guide frame having downwardly inclined walls 31, by means of which the cans released from the belt 11 are delivered gravitationally to the belt conveyor 15 for disposal between the rolls 13 and 14.

As shown more particularly in Figs. 3 and 5, the lead of the rib or flight 18 is such that the spaces formed between the same and the smooth outer surface of the companion roll 14 are sufficient to accommodate but a single can, since the diameter of each can is such as to permit the same to be received when in an upright or erect position between the smooth outer peripheral surfaces of said rolls but not if the cans were positioned between a portion of the helical rib or flight and the roll 14.

Preferably, the rotational speed of said rolls and the linear speed of the belt 15 are coordinated so that the cans move along the rolls in parallel relation thereto on the belt 15 without undue friction or crowding of the rolls.

Any suitable and convenient means may be employed for imparting movement to the belt 15 and its associated rolls 13 and 14. In this instance, the frame structure 10 has been shown as equipped with an electric drive motor 32, the armature shaft of which is provided with a sheave 33 around which passes one or more endless V-belts 34, the latter driving an enlarged belt wheel 35 fixed on a longitudinally extending shaft 36.

The belt 15 passes at its ends around rolls indicated at 37, which are suitably supported by shafts indicated at 38 and 39 in bearings 40 carried by the frame 10. The shaft 39, at the discharge end of the conveyor 15, has keyed on one end thereof a belt wheel 41, around which passes an endless belt 42, the latter being also passed around a sheave 43 mounted in the shaft 36. The sheave 43 and the belt wheel 41 are disposed in relatively perpendicular planes, and the belt 42 is, therefore, trained around a guide structure 44 so that it may be twisted in the intermediate runs thereof for adaptation to the operating planes of the wheel 41 and the shaft 43. Through this arrangement, the belt 15 may be driven at a desired linear rate of speed for conducting the cans 12 between the rolls 13 and 14. The shaft 43 may be of the type having an adjustable pitch diameter which may be varied through adjustment to control the speed of operation of the main belt 15.

To effect the rotation of the order-arranging rolls 13 and 14, the latter may be provided at their forward ends, as shown in Fig. 7, with sprocket wheels 45 and 46. Passing over the sprocket wheel 45 and under the sprocket wheel 46 is an endless chain 47, the latter also passing over a guide sprocket 48 so disposed as to enable the chain to make proper extended contact with the sprocket 46. From the guide sprocket 48, the chain 47 extends over a drive sprocket 49 which is carried by one end of the longitudinally extending shaft 36. By training the chain 47, as disclosed, around the sprocket wheels 45 and 46, the rolls 13 and 14 rotate in the opposite directions, indicated by the arrow $c$ in Fig. 7.

The rolls 13 and 14 are positioned with their ends in parallel relationship and at such a distance apart that the cans could pass between the rolls if it were not for the helical flight or rib 18 on the roll 13. This rib or flight causes the cans leaving the hopper boards 31 to drop on end between the rolls and onto the moving conveyor belt 15. When the rolls are rotated in the manner indicated by the arrows $c$ in Fig. 7, and with the belt 15 moving in the direction disclosed by the arrow $d$ of Fig. 3, traveling pockets or spaces between the rolls are produced for the individual cans. The motion of the rolls tends to adjust or move the cans until they find a space in which to drop, after which they are supported and carried along by the upper run of the belt 15, barely touching the helical rib or flight which functions only as a spacer after the cans have found an upright position between the leads thereof. Should cans be introduced to the rolls in excessive quantities, the extra cans will ride on top of the cans which have found spaces between the rolls. At a space between the discharge end of the rolls and the entrance of the track structure T, the extra cans are scraped or forced off to one side and returned to the receiving end of the conveyor rolls by the belt 17.

Thus as shown in Figs. 1 and 4, the frame structure includes a diverting baffle 50 having an angular side 51, which is mounted on the frame 10 in a horizontal plane above the belt 15 in a manner causing cans superimposed on those directly in contact with the belt 15 to be moved laterally to one side and directed by a chute 52 upon the lower receiving end of the return conveyor 17. This conveyor is formed with spaced cross flights 53 so that the cans may be elevated and restored to the magazine or hopper 31. Such restoration is effected by the provision of a second chute 54, which is arranged at the upper or discharge end of the conveyor belt 17 and is inclined downwardly and inwardly to direct cans released from the belts 17 in a lateral direction for deposit or redeposit in or on the rolls 13 and 14.

The track structure T is of conventional formation and is so formed as to turn the cans introduced therein from vertical positions to substantially horizontal positions, so that they may be allowed to roll to the labeling and boxing devices, not shown.

To drive the return belt 17, the latter is provided at one end with a drive shaft 55 to which is secured a gear 56. This gear meshes with a similar gear 57 arranged on a countershaft 58 below the shaft 55 and supported by the frame structure of the conveyor belt 17. The shaft 58 is driven by an endless belt or chain drive 59 from the head shaft 27 of the conveyor 11.

In view of the foregoing, it will be seen that the present invention provides a machine which operates at high speed and capacity for arranging cylindrical bodies in a desired order, such a machine being known in the art as an "unscrambling" machine. The cans being handled by the apparatus move forwardly and longitudinally at a high rate of linear travel, and when the apparatus is functioning normally, there is no interruption in the longitudinal advance of the cans. The cans do not remain stationary in the region defined by the walls 31, and even those cans arranged above those deposited on the belt 15 and disposed between the rolls 13 and 14, continue to move longitudinally of the machine toward the discharge end thereof. If the cans do not find deposit on the upper run of the belt 15 by the time they have passed the rolls 13 and 14, such superposed cans are engaged by the diverter 50 and moved into the chute 34 for deposit on the return conveyor 17, in order that they may again be subjected to the operation of the rolls 13 and 14.

Normally, the apparatus arranges in the track structure T orderly rows of cans at the rate of approximately two hundred cans per minute. If for any reason the cans should encounter an obstruction in said track structure, that is, if the latter should become clogged, as through the presence therein of an improperly positioned or wedged can, automatic relief is provided by the convex shoulder 60 provided on the inner face of a frame-supported guide plate 61. When the cans are close together on the discharge end of the belt 15 in compacted relationship as will occur when the track T is clogged, the shoulder 60 operates to force the cans laterally so that they are slightly out of alignment with the can which follows. As the belt conveyor moves forwardly, this non-alignment will cause the can, which has been thrown out of alignment by the protuberance 60, to be squeezed sidewise and into the chute 34 leading to the return conveyor, thus recirculating the cans automatically until the obstructing condition is removed.

While I have set forth what I consider to be the preferred embodiment of the present invention, nevertheless, the same is subject to certain modification or variation without departing from the spirit and scope of the following claims.

I claim:

1. An apparatus for aligning articles disposed in helter-skelter relationship comprising a frame, a pair of spaced parallel rotating rolls mounted on said frame, one only of said rolls being provided with a longitudinally extending helical rib, said rib cooperating with a plain cylindrical surface present on the periphery of the other of said rolls to form traveling article-receiving pockets between said rolls, and a base conveyor supported by said frame having an upper run movable below and in registry with an article-space present between said rolls to effect the support of articles independently of said rolls and move said articles longitudinally between said rolls in a manner normally independently of said helical rib.

2. A apparatus for aligning articles disposed in helter-skelter relationship comprising a frame, a pair of spaced parallel rotating rolls mounted on said frame, one only of said rolls being provided with a longitudinally extending helical rib, said rib cooperating with a plain cylindrical surface present on the periphery of the other of said rolls to form traveling article-receiving pockets between said rolls, a base conveyor supported by said frame having an upper run movable below and in registry with an article-space present between said rolls to effect the support of articles independently of said rolls and move said articles longitudinally between said rolls in a manner normally independently of said helical rib, and coordinated means for imparting rotation to said rolls and movement to said conveyor at relative speeds so timed that the movement of the articles between said rolls is effected by said conveyor, the rolls and the rib thereon serving to form traveling pockets in which articles are individually received and maintained in longitudinally aligned upright positions while moving with said conveyor.

3. In apparatus for arranging cylindrical cans disposed in relatively helter-skelter order in a longitudinally aligned vertical order, a frame, a pair of relatively spaced parallel cylindrical rolls mounted for rotation on said frame, one only of said rolls being provided with a longitudinally extending helical rib on its outer surface, said rib cooperating with the plain cylindrical surface present on the periphery of the other of said rolls to form traveling article-receiving pockets between said rolls, a belt conveyor supported by said frame with its upper run arranged in registry with the space formed between and below said rolls, said belt serving to effect the support of articles positioned in the traveling pockets provided between said rolls by said rib, coordinated driving means for imparting rotation to said rolls and movement to said conveyor at relative speeds so timed that the movement of the articles between said rolls is effected by said conveyor, the spacing between the plain cylindrical surfaces of said rolls being such as to receive therein a cylindrical can in an upright position and the space between the crest portions of said rib and the plain cylindrical surface of the adjacent roll being less than that of the diameter of said cans, whereby to produce the said traveling pockets between said rolls.

4. In apparatus for arranging cylindrical cans disposed in relatively helter-skelter order in a longitudinally aligned vertical order, a frame, a pair of relatively spaced parallel cylindrical rolls mounted for rotation on said frame, one only of said rolls being provided with a longitudinally extending helical rib on its outer surface, said rib cooperating with the plain cylindrical surface present on the periphery of the other of said rolls to form traveling article-receiving pockets between said rolls, a belt conveyor supported by said frame with its upper run arranged in registry with the space formed between and below said rolls, said belt serving to effect the support of articles positioned in the traveling pockets provided between said rolls by said rib, coordinated driving means for imparting rotation to said rolls and movement to said conveyor at relative speeds so timed that the movement of the articles between said rolls is effected by said conveyor, a delivery conveyor, and a hopper supported by said frame above said rolls in registry with the discharge end of said delivery conveyor, said hopper receiving the cans disposed in helter-skelter order for deposit in longitudinal rows in the pockets provided between said rolls.

5. In apparatus for arranging cylindrical cans disposed in relatively helter-skelter order in a longitudinally aligned vertical order, a frame, a pair of relatively spaced parallel cylindrical rolls mounted for rotation on said frame, one only of said rolls being provided with a longitudinally extending helical rib on its outer surface, said rib cooperating with the plain cylindrical surface present on the periphery of the other of said rolls to form traveling article-receiving pockets between said rolls, a belt conveyor supported by said frame with its upper run arranged in registry with the space formed between and below said rolls, said belt serving to effect the support of articles positioned in the traveling pockets provided between said rolls by said rib, coordinated driving means for imparting rotation to said rolls and movement to said conveyor at relative speeds so timed that the movement of the articles between said rolls is effected by said conveyor, and delivering means for depositing cans in a helter-skelter order on the receiving or forward ends of said rolls to enable the latter to align said cans in longitudinal order upon their release from the discharge ends of said rolls.

6. In apparatus for arranging cylindrical cans disposed in relatively helter-skelter order in a longitudinally aligned vertical order, a frame, a pair of relatively spaced parallel cylindrical rolls mounted for rotation on said frame, one only of said rolls being provided with a longitudinally extending helical rib on its outer surface, said rib cooperating with the plain cylindrical surface present on the periphery of the other of said rolls to form traveling article-receiving pockets between said rolls, a belt conveyor supported by said frame with its upper run arranged in registry with the space formed between and below said rolls, said belt serving to effect the support of articles positioned in the traveling pockets provided between said rolls by said rib, coordinated driving means for imparting rotation to said rolls and movement to said conveyor at relative speeds so timed that the movement of the articles between said rolls is effected by said conveyor, delivery means for depositing cans in a helter-skelter order on the receiving or forward ends of said rolls to enable the latter to align said cans in longitudinal order upon their release from the discharge ends of said rolls, and transfer mechanism for the reception of the cans discharged from said rolls and belt conveyor.

7. An apparatus for aligning articles disposed in helter-skelter relationship comprising a frame, a pair of elements mounted on said frame, said elements being horizontally spaced from one another to provide a space for receiving the articles, one of said elements being a roll provided with a longitudinally extending helical rib on the periphery thereof, means for rotating the roll element, the other of said elements forming a plain surface extending parallel with the confronting peripheral surface of the roll element, a base conveyor supported by said frame having a run movable below the spaced elements and cooperating with said elements and rib to provide a plurality of article-receiving pockets and to effect bottom support of articles and move said articles longitudinally between said elements, means for moving the conveyor and means for delivering articles to one end of said elements.

8. Apparatus such as that defined in claim 7 and including a transfer mechanism for the reception of cans discharged from the base conveyor when seated in upright position and for effecting misalignment of the upright cans between the conveyor and transfer mechanism.

9. Apparatus such as that defined in claim 7 and including a transfer mechanism for the reception of cans discharged from the base conveyor when seated in an upright position, and a protuberance between the discharge end of the elements and the transfer mechanism and disposed in the path of movement of the upright cans for effecting misalignment of said cans.

DONALD R. HOLDREN.

REFERENCES CITED

The following references are of record in the file of this patent:

UNITED STATES PATENTS

| Number | Name | Date |
|---|---|---|
| 1,649,304 | Gray | Nov. 15, 1927 |
| 2,377,431 | Lakso | June 5, 1945 |
| 2,496,019 | Peel | Jan. 31, 1950 |